Sept. 11, 1951   G. W. ASHLOCK, JR   2,567,590
MACHINE FOR STUFFING OLIVES
Filed June 14, 1949   5 Sheets-Sheet 1

INVENTOR
*George W. Ashlock Jr.*
BY *Robert H. Eckhoff*
ATTORNEY

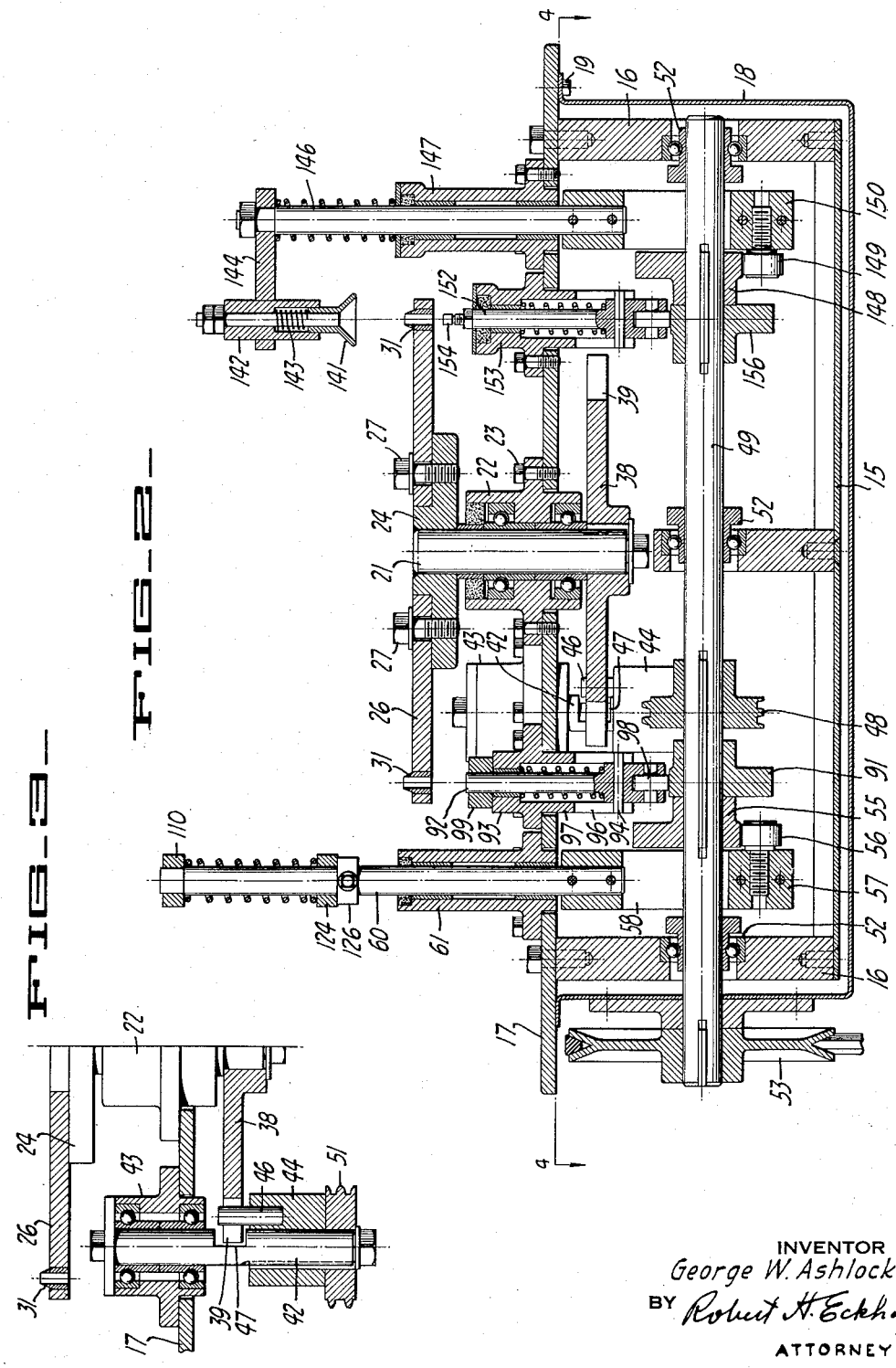

Sept. 11, 1951  G. W. ASHLOCK, JR  2,567,590
MACHINE FOR STUFFING OLIVES
Filed June 14, 1949  5 Sheets-Sheet 3
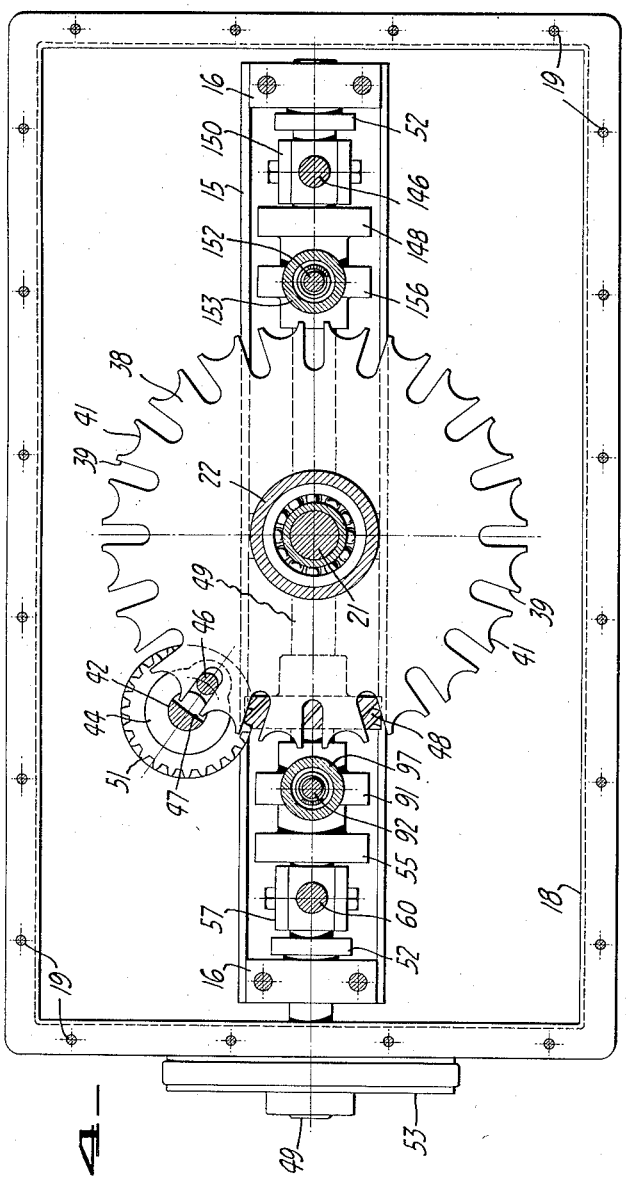
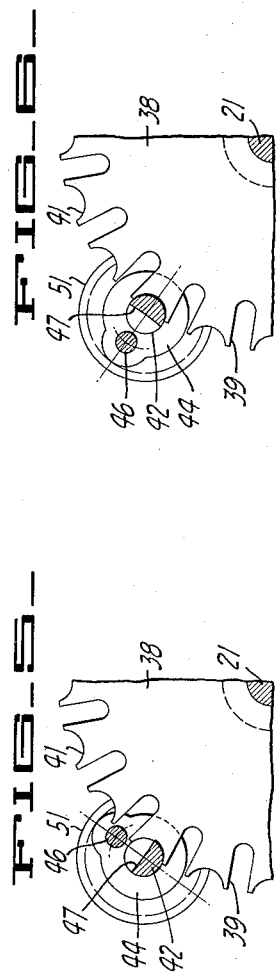
INVENTOR
George W. Ashlock Jr.
BY Robert H. Eckhoff
ATTORNEY

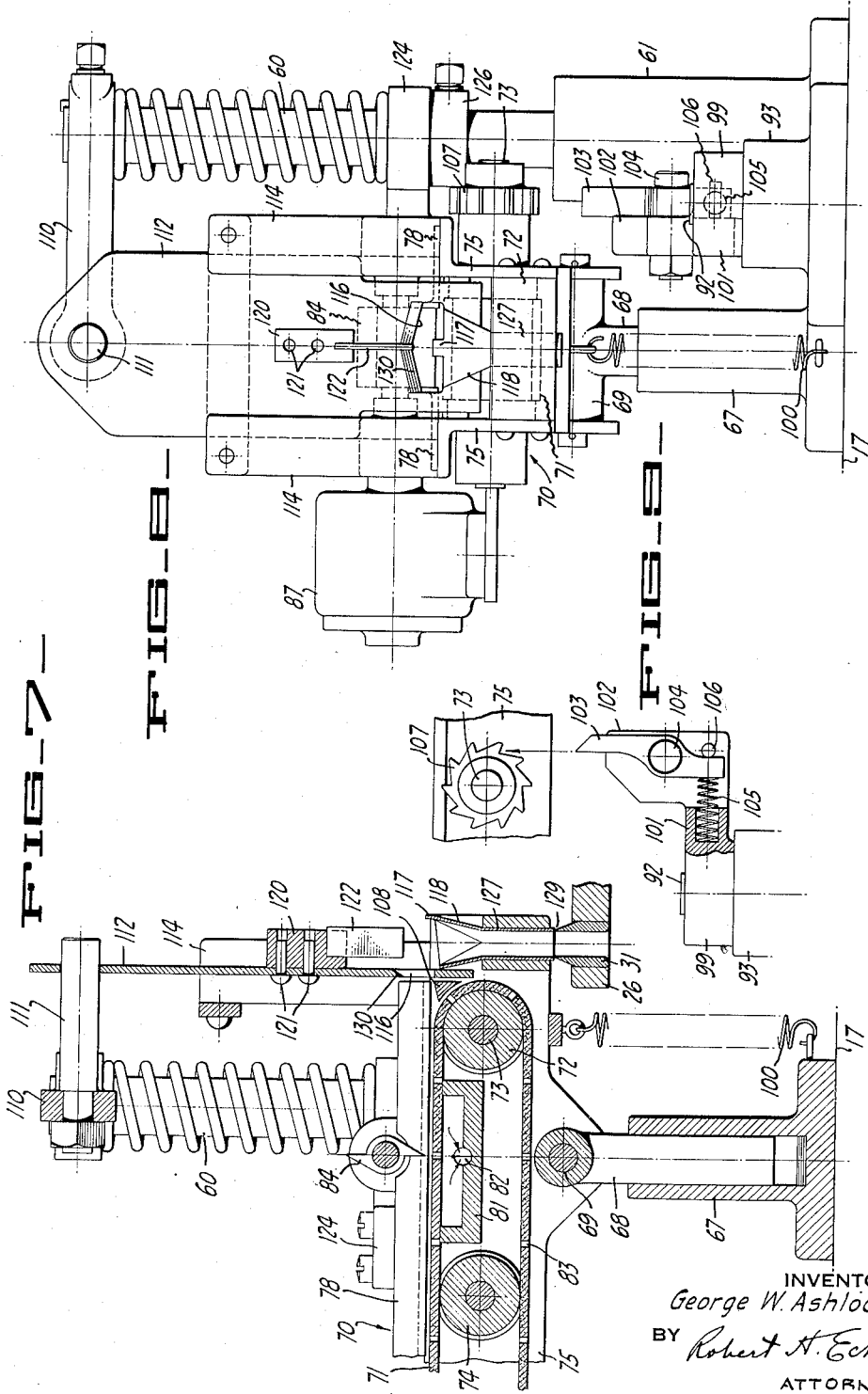

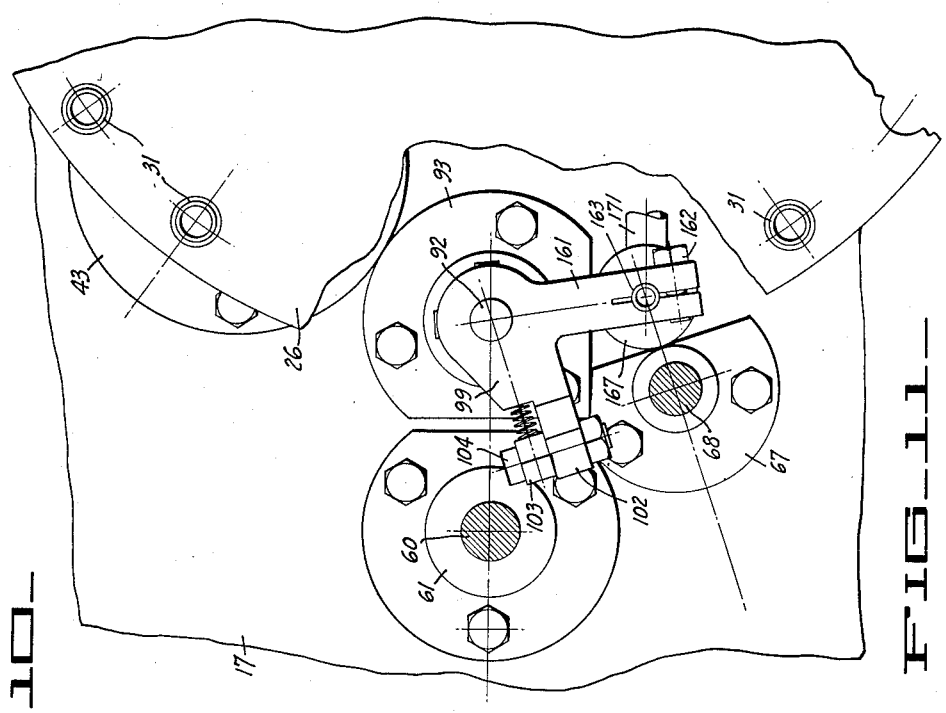
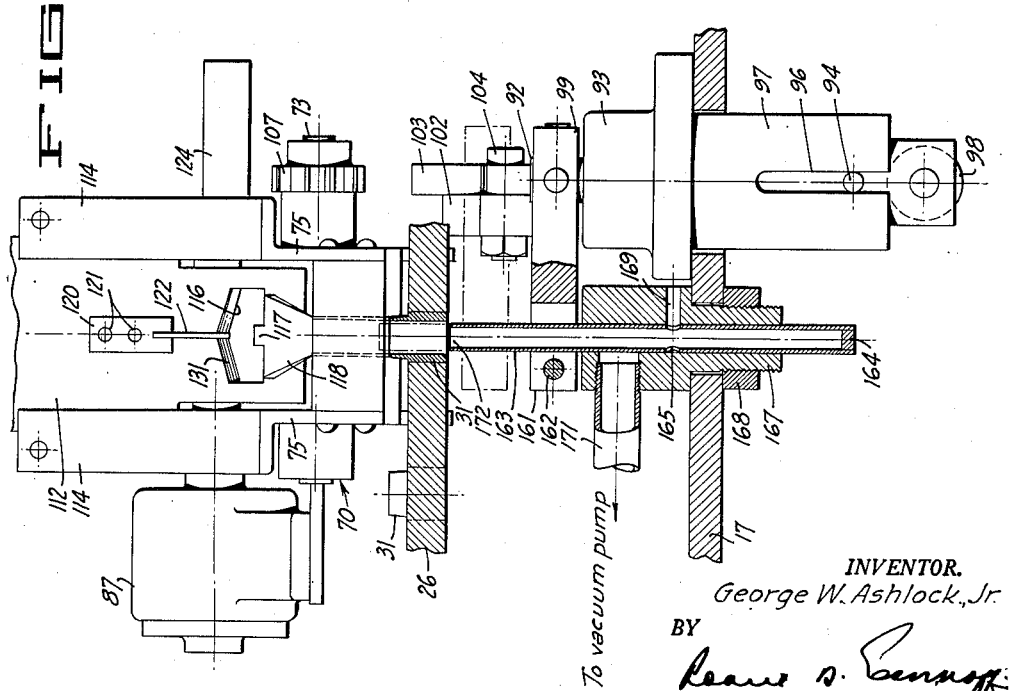

Patented Sept. 11, 1951

2,567,590

UNITED STATES PATENT OFFICE 2,567,590

MACHINE FOR STUFFING OLIVES

George W. Ashlock, Jr., Oakland, Calif.

Application June 14, 1949, Serial No. 99,041

3 Claims. (Cl. 146—1)

This invention relates to a machine for stuffing a material such as a strip of pimento and the like into a prepared article such as a pitted olive. It has been successfully employed on the preparation and stuffing of pimento strips into pitted olives, and will therefore be described particularly in this connection, although it is not limited in its application to use merely with either of these materials.

Pimento stuffed olives have heretofore either been hand or machine stuffed. Hand stuffing has been performed with pimento paste or pimento strips, while machine stuffing has been confined to a paste. Paste stuffing is unsatisfactory generally because if the paste is made stiff enough to remain in the olive it is difficult and slow to handle. Further, after the olives are stuffed, the paste usually works out. If the olives are stuffed with pimento strips, the operation is slow and costly because prior to this invention it has only been performed by hand.

In accordance with this invention, I provide a machine for automatically stuffing prepared articles such as olives with materials such as pimento strips.

It is in general the broad object of the present invention to provide a suitable method and apparatus for preparation of pimento and the like in suitable strip forms for stuffing into olives and like pitted fruit.

Another object of the present invention is to provide for transfer of a preformed strip of pimento into a pitted olive.

A further object of the present invention is to provide a machine for stuffing solid materials into pitted olives and the like.

The invention includes other objects and features of advantage, some of which, together with the foregoing, will appear hereinafter wherein the present preferred form of machine of this invention is disclosed.

In the drawing accompanying and forming a part hereof, Figure 1 is a plan view of said machine.

Figure 2 is a section taken along the line 2—2 of Figure 1.

Figure 3 is a section taken along the line 3—3 of Figure 1.

Figure 4 is a section taken along the line 4—4 of Figure 2.

Figures 5 and 6 are fragmentary views illustrating different positions of the turn table mechanisms.

Figure 7 is a section taken along the line 7—7 of Figure 1, illustrating the pimento shaving mechanism and the cut-off mechanism.

Figure 8 is a front view of the pimento preparing mechanism.

Figure 9 is a fragmentary view of the pimento conveyor advancing mechanism.

Figure 10 is a front elevation showing the mechanism utilized to advance the pimento feed conveyor and to draw a preformed strip of pimento into position in one of the tubes 31.

Figure 11 is a plan view of the structure shown in Figure 10 with a portion of the structure broken away.

The frame

Figure 1:
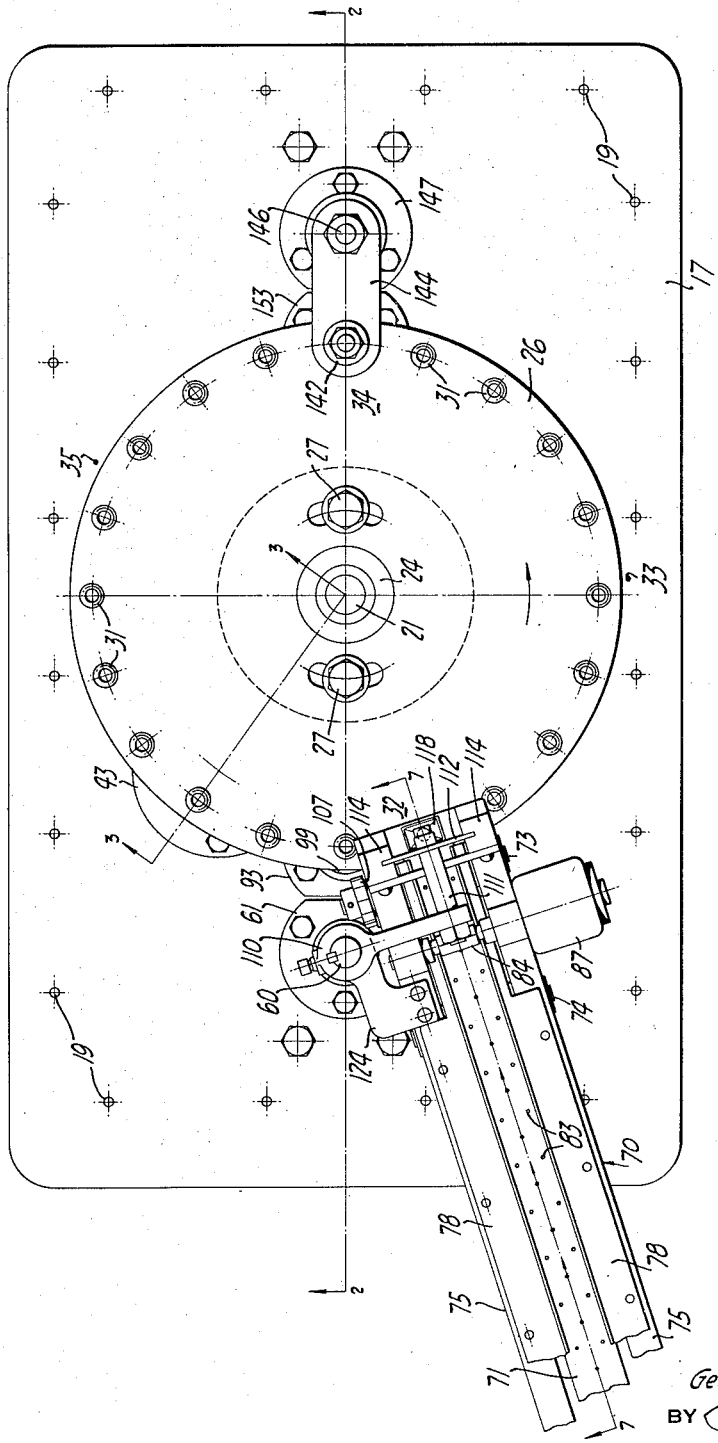

To provide a suitable support for the various elements I provide a suitable base structure 15 having several walls 16 on which is mounted a cover 17. A sheet metal casing 18 is placed about the base and is secured by studs 19 to the cover 17 to enclose the several elements and protect them.

The olive carrier

Mounted upon the cover 17 is a vertically extending shaft 21 supported in a suitable bearing structure 22 secured by studs 23 to the cover 17. At its upper end, shaft 21 carries a flange 24 to which a circular table 26 is secured by studs 27. Table 26 is thus removably mounted on the shaft to permit its removal so that access can be secured to presently described operating elements normally lying beneath the table. Mounted in the table and extending about its periphery are a plurality of spaced tubes 31. As will presently appear, the pimento strips are inserted into each of these and thereafter an olive is placed on the tube.

Referring to Figure 1, the table is advanced stepwise past a tube filling station generally indicated at 32. At this station each tube is filled with a pimento strip. Filled tubes move through the olive positioning station generally indicated at 33, whereat an operator positions on each upwardly extending and filled tube a previously pitted olive. The table then advances toward the olive stuffing station 34 wherein the stuffing placed in each tube at station 32 is forced into the olives carried on the tubes. Thereafter the table advances to the stuffed olive removing station indicated at 35. While a circular table has been disclosed as the preferred form of conveyor for the filling tubes, any other form can be utilized such as one moving over a path in a vertical plane.

Table rotation

The stepwise advance of the table 26 is secured by employing a suitable Geneva movement. As appears in Figures 2, 4, 5 and 6, I mount a Geneva wheel 38 on the lower end of shaft 21. The periphery of this wheel includes a plurality of notches 39 connected together by circular indentations 41. A continuously rotated shaft 42 is supported in suitable bearings 43 and carries a Geneva drive element indicated generally at 44 which is keyed to shaft 42. It carries pin 46 which is adapted to enter into each slot 39 in turn as the shaft 42 is continuously rotated. As appears in Figures 3, 5 and 6, shaft 42 is cut away as at 47 so that when the pin is in engagement with a slot it is effective to rotate the wheel; during that period the pin is in a slot, cut away portion 47 on shaft 42, permits the pin to rotate the wheel. As the pin moves out of a slot, shaft 42 engages an indentation to center and lock the table in a predetermined position.

Shaft 42 is driven by a spiral cut helical gear 48 on a shaft 49, gear 48 engaging a like gear 51 on shaft 42 and which forms a part of element 44. Shaft 49 is mounted in suitable bearings indicated at 52 in the several walls 16, one end of the shaft extending beyond the housing and carrying a pulley 53 to be driven by any suitable constantly moving prime mover.

The pimento preparing mechanism drive

Mounted adjacent one end of the shaft 49 is an eccentric 55 keyed to the shaft. The surface of this eccentric is followed by a roller 56 carried upon the vertically reciprocating plunger support 57, bifurcated as at 58 to slide on the shaft 49 which acts as a guide. A vertically extending plunger 60 is supported in suitable vertical bearings 61 carried upon cover 17. As the shaft 49 is rotated, plunger 60 is reciprocated to operate certain presently described mechanism.

The pimento feed

Mounted upon cover 17 is a cylinder 67 within which a plunger 68 is positioned. Operatively mounted as at 69 on an end of the plunger is one end of a pimento conveyor structure generally indicated at 70. This conveyor includes a conveyor belt 71 formed of a suitable material which will carry pimento without permitting the pimento to slip thereon, such as a suitable rubber composition belt. This is extended about a suitable support roller 72 carried upon a shaft 73 mounted between angle frames 75 of the conveyor 70. Intermediate the ends of the conveyor 70 an auxiliary support roller 74 is provided. The conveyor is advanced intermittently, as will presently appear, in the direction of the arrows in Figure 1, and pimento is placed thereon by an operator. Guide plates 78 are secured on each side of the conveyor to confine the pimento and direct it on toward certain presently described operations.

Pimento shaving

Between rollers 72 and 74 a trough like member 81 is provided, engaging the under side of the conveyor belt 71. A suction is applied to the apertures 83 in the belt 71 by a vacuum pump (not shown) and connected to trough 81 through passage 82; the suction is applied to the under side of the belt and to pimento carried on the upper side of the belt through apertures 83 in the belt to hold pimento firmly on the belt while the pimento is shaved by a transverse rotating knife 84 positioned immediately above the belt between rollers 72 and 74. The knife extends across the width of the belt and is spaced from the belt so that the pimento is shaved to a uniform thickness, excess pimento being thrown off and discharged by the rapidly rotating knife. An electric motor 87 is mounted on the side of the conveyor structure to rotate the knife at a high speed.

Pimento conveyor advance

Mounted adjacent to cam 55 is another cam 91 keyed to shaft 49. Directly over the center line of the shaft a vertically reciprocating plunger 92 is mounted in suitable bearings indicated at 93 and supported on cover 17. The lower end of the plunger is guided by pin 94 moving in a slot 96 in a depending portion 97 of the bearing 93. This end of the plunger also carries a roller 98 engaged with the cam 91. The upper end of the plunger 92 carries a collar 99 suitably secured thereto and having an extending arm 101. The arm includes a vertically extending portion 102 providing a support for a lever 103 mounted pivotally thereon at 104, and urged by a spring 105 to engage a pin 106. When plunger 92 moves upward, arm 103 is brought into engagement with a ratchet wheel 107 mounted on shaft 73 to rotate the ratchet wheel in a counterclockwise direction in Figure 9, spring 105 permitting the arm to be retracted as the plunger 92 returns to its lowermost position. In this way the conveyor 71 is advanced step by step to feed material off the end thereof over the pimento guide plate and support 108 positioned at the end of the conveyor belt 71.

The pimento cut-off and tucking

The pimento passing over the end of the conveyor belt 71 and the guide plate 108 is severed. To accomplish this, an extending arm 110 is mounted on the upper end of plunger 60, the arm extending over the run of the conveyor. An extension 111 is secured thereto, the extension running along the run of the conveyor in the direction of advance. At its forward end, the extension 111 carries a knife plate 112 reciprocal in vertical guides 114. The plate is apertured as at 116 to permit a pimento strip advanced off the conveyor and over the guide 108 to pass through the aperture and engage lip 117 formed on funnel 118 supported on the front of the conveyor structure 70. A block 120 is secured as by rivets 121 to an upper portion of the knife plate 112. A finger 122 depends from this block to engage and force down into funnel 118 a strip of pimento extended between guide 108 and lip 117.

Operation

In operation, plunger 92 raises lever 103 to rotate the ratchet wheel 107 and rotate shaft 73 to advance the conveyor belt 71. As the conveyor is advanced, the pimento thereon is tripped by the knife 84. As soon as the conveyor belt 71 has come to rest, plunger 60 is moved downwardly. This lowers the entire conveyor frame 70 for this is supported by arm 124 engaged with adjustable collar 126 on plunger 60. The downward movement of the conveyor frame is limited by the bottom of tube 127, which continues funnel 118, engaging the rim 129 on a positioned stuffing tube 31. Spring 100 ensures a snug engagement of the tube and a tube rim. However, the downward movement of plunger 60 continues and knife edge 130 on the upper portion of aperture 116 in the knife plate is brought into action, severing the pimento from that remaining on the conveyor belt 71 and plate 108. At the same time, finger 122 forces the pimento into the funnel 118. Thereafter, the pimento in the funnel 118 is drawn into the tube portion 127 by suitably applied suction, presently described hereinafter in detail.

Cams 91 and 55 are so formed that the advance of the pimento conveyor belt 71 and reciprocating movement of the plunger 69 are suitably timed with each other and with the step by step rotation of the stuffing table 26.

Transfer of the pimento

Referring particularly to Figures 10 and 11, plunger 92 carries an arm 161 secured to collar 99. The arm 161 is bifurcated and a stud 162 is provided to draw the bifurcated arm securely around a tube 163 which extends vertically through the arm and which is clamped by the arm and stud 162 so the tube is reciprocated with plunger 92. The lower end of tube 163 is closed by a plug 164, while an intermediate portion of the tube has an aperture 165 therein. The tube is reciprocated vertically in a stationary member 167, the latter being secured to table 17 by a nut 168. Member 167 includes a passage 169 communicating with the atmosphere and a pipe 171 leading to a suitable vacuum pump. When the tube 163 is in that position in which it appears in full lines in Figure 10, the vacuum is applied to the tube from pipe 171 but aperture 165 is not in alignment for vacuum application. When plunger 92 and arm 161 are raised to the dotted line position in Figure 10, the tube then extends through a positioned pimento carrying receptacle 31 with aperture 165 opposite pipe 171 for vacuum application to place a suction upon the upper end 172 of the tube 163 so that the pimento in the funnel 118 is engaged by the end of the tube and is held firmly by application of the vacuum. Thus, the tube is effective upon being lowered, to draw pimento down into the receptacle 31, through which it has just advanced. However, when the tube reaches the position just beneath the receptacle, aperture 165 is moved from vacuum application and is again placed in communication with the atmosphere and so releases the pimento so that the latter is permitted to remain in the receptacle 31.

Ejection of the material

As each filled tube 31 advances past the olive positioning station 33, an olive is placed thereon by the operator. When the olives and filled tubes arrive at the stuffing transfer station 34 each olive is engaged by a suitable retainer indicated at 141 and slidably mounted in a support 142. A light spring 143 is provided between the retainer 141 and its support to permit only a limited pressure application to the olive. Support 142 is mounted upon an arm 144 which in turn is mounted upon a vertically reciprocating plunger 146 supported in a vertical bearing 147. The lower end of the plunger is engaged with a cam 148 similar to cam 55 which is followed by a roller 149 carried upon a plunger support 150 similar to plunger support 57. As each tube 31 is advanced to the transfer station, plunger 146 is lowered and retainer 141 engages an olive positioned on the tube to retain it during transfer of the filling from the tube into the positioned and retained olive.

Transfer of the tube filling material

To accomplish transfer of the tube filling, a vertically reciprocal plunger 152 is mounted in suitable vertically extending bearings 153, similar to bearings 93, the plunger also being similar to plunger 92 except that its end 154 is adapted to enter into each tube 31 as the tube is positioned; cam 156, similar to cam 91, is provided on shaft 49 to raise and lower plunger 152.

I claim:

1. In a machine of the character described; an open ended vertical tube of generally circular section and having a funnel of generally rectangular shape in horizontal section provided at the upper end thereof, said funnel having a major and a minor axis; a flat finger positioned above said tube and aligned centrally of the tube and extending in a plane parallel to the minor axis of the funnel; means for feeding continuously a strip of material to position the length thereof over the upper end of the funnel; means for cutting said length following its positioning over said funnel end; means for moving said finger down into said tube to tuck said length of material, positioned across the upper end of said funnel upon itself into a cylindrical plug; means for withdrawing the flat finger from the tube; a conveyor having a plurality of serially arranged vertical open-ended transfer tubes thereon; means for moving the conveyor past the lower end of the first mentioned tube to receive the cylindrical plug of material from said first mentioned tube; and means for transferring the cylindrical plug of material from within the first mentioned tube to a positioned transfer tube to fill the transfer tube.

2. In a machine of the character described; an open ended vertical tube of generally circular section and having a funnel at its upper end, means for placing over the funnel a strip of material for tucking upon itself in the tube; a flat finger positioned above said tube and aligned centrally of the tube; means for moving said finger down into said tube to tuck a strip of material, previously positioned across the upper end of said tube, upon itself and form a cylindrical plug; means for withdrawing the flat finger from the tube; a conveyor having a plurality of serially arranged vertical open ended transfer tubes thereon; means for moving the conveyor past the lower end of the tucking tube to position one transfer tube at a time beneath the tucking tube to receive the cylindrical plug of material from the tucking tube; means for transferring the cylindrical plug material from the tucking tube to a positioned transfer tube to fill the transfer tube; means for retaining a cored olive in position on the upper end of a filled transfer tube; and a plunger for moving the cylindrical plug of material from a transfer tube into an olive while the olive is retained in position by said retaining means.

3. In a machine of the character described; an open ended vertical tube of circular section and having a funnel of generally rectangular shape in horizontal section provided at the upper end thereof, said funnel having a major and a minor axis; a flat finger positioned above said tube and aligned centrally of the tube and extending in a plane parallel to the minor axis of the funnel; means for feeding continuously a strip of material to position the length thereof over the upper end of the funnel; means for cutting said length following its positioning over said funnel end; means for moving said finger down into said tube to tuck said length of material, positioned across the upper end of said funnel, upon itself and form a cylindrical plug; means for withdrawing the flat finger from the tube; a conveyor having a plurality of serially arranged vertical open ended transfer tubes thereon; means for moving the conveyor past the lower end of the first mentioned tube to position one transfer tube at a time beneath the first mentioned tube to receive the cylindrical plug of material from the first mentioned tube; means for transferring the cylindrical plug of material from within the first mentioned tube to a positioned transfer tube to fill the transfer tube; means for retaining a cored olive in position on the upper end of a filled transfer tube; and a plunger for moving the cylindrical plug of material from a transfer tube into an olive while the olive is retained in position by said retaining means.

GEORGE W. ASHLOCK, Jr.

REFERENCES CITED

The following references are of record in the file of this patent:

UNITED STATES PATENTS

| Number | Name | Date |
| --- | --- | --- |
| 667,423 | Brown | Feb. 5, 1901 |
| 1,133,054 | Newcomb | Mar. 23, 1915 |
| 1,436,005 | Barggren | Nov. 21, 1922 |
| 1,502,929 | Tuttle | July 29, 1924 |
| 1,643,260 | Siegert | Sept. 20, 1927 |
| 1,692,429 | Wanders | Nov. 20, 1928 |
| 1,886,388 | Gardner | Nov. 8, 1932 |
| 2,179,024 | Slocum | Nov. 7, 1939 |
| 2,282,477 | Joa | May 12, 1942 |
| 2,342,369 | Ransbottom | Feb. 22, 1944 |
| 2,351,788 | Smith | June 20, 1944 |
| 2,384,429 | Ball | Sept. 11, 1945 |

FOREIGN PATENTS

| Number | Country | Date |
| --- | --- | --- |
| 71,373 | Sweden | Sept. 5, 1927 |